UNITED STATES PATENT OFFICE.

SAMUEL PEACOCK, OF PHILADELPHIA, PENNSYLVANIA, ASSIGNOR TO INTERNATIONAL AGRICULTURAL CORPORATION, OF NEW YORK, N. Y., A CORPORATION OF NEW YORK.

PROCESS OF EXTRACTING POTASSIUM FROM FLUE-DUST.

1,124,798.  Specification of Letters Patent.  Patented Jan. 12, 1915.

No Drawing.  Application filed April 18, 1914. Serial No. 832,816.

*To all whom it may concern:*

Be it known that I, SAMUEL PEACOCK, a citizen of the United States, residing at Philadelphia, in the county of Philadelphia and State of Pennsylvania, have invented certain new and useful Improvements in Processes of Extracting Potassium from Flue-Dust; and I do hereby declare the following to be a full, clear, and exact description of the invention, such as will enable others skilled in the art to which it appertains to make and use the same.

This invention relates to a process of extracting potassium in the form of salts from flue dust and has for its object to save the valuable potash which now goes to waste, and in a manner more expeditious and less expensive than has been heretofore proposed.

With these and other objects in view the invention consists in the novel steps constituting my process as will be more fully hereinafter disclosed and particularly pointed out in the claims.

It is well known that the flue dust resulting from the manufacture of Portland cement for example, as well as from other sources, includes valuable potassium salts. In the ordinary process of furnacing as much as 50% to 75% of the potassium contained in the furnace charge is volatilized and passes out of the kiln with the flue dust. Further it is known that of the total potassium found in this dust from 40% to 60% is usually combined as a basic silicate and is insoluble in water.

According to my invention I treat the flue dust with water to extract any water soluble potassium oxid ($K_2O$) that may be present; and in order to recover the potassium from its silicate combinations I employ a solution made by extracting ordinary acid phosphate in water and which solution contains phosphoric acid chiefly in the form known as mono-calcium phosphate. I have discovered that when the basic potash salts or silicates above referred to are finely ground and digested with a hot solution of this mono-calcium phosphate a reaction occurs which yields potassium phosphate and calcium silicate. I have not as yet been able to determine the exact nature of the reaction which takes place, but I have reason to believe that the potassium phosphate is partly mono-potassium phosphate and partly di-potassium phosphate. I have also discovered that when calcium silicate which contains a postassium salt is finely ground, and digested with acids, such for example as sulfuric acid, the potassium is recovered in the form of a soluble salt of the acid used. Accordingly I may treat the flue dust with a suitable acid and thus recover any potassium which may be mechanically bound in the calcium silicate found in said dust. It therefore follows that by my process I am enabled to convert all of the potassium salts found in the ordinary flue dust, obtained, for example, from the cement industry, into soluble salts and can therefore recover the potassium from the solutions in any suitable and well known manner.

It is obvious that those skilled in the art may vary the details of my process, without departing from the spirit thereof and therefore I do not wish to be limited by the above disclosure, except as may be required by the claims.

What I claim is:

1. The process of recovering the potassium contained in flue dust which consists in treating said flue dust with a solution containing mono-calcium phosphate to react with any potassium silicates present to form postassium phosphates, and suitably recovering said phosphates from the solution, substantially as described.

2. The process of recovering the potassium contained in flue dust which consists in treating said dust with a solution of mono-calcium phosphate to react with any potassium silicates present and also with an acid to react with any potassium salts, that may be mechanically held by said silicates, substantially as described.

In testimony whereof I affix my signature, in presence of two witnesses.

SAMUEL PEACOCK.

Witnesses:
T. A. WITHERSPOON,
FRANCES SIEBEL.